United States Patent [19]

Aylward

[11] 4,435,520

[45] Mar. 6, 1984

[54] CATALYST COMPOSITION

[75] Inventor: David E. Aylward, Madison, N.J.

[73] Assignee: Cities Service Co., Tulsa, Okla.

[21] Appl. No.: 444,296

[22] Filed: Nov. 24, 1982

[51] Int. Cl.$^3$ .............................................. C08F 4/68
[52] U.S. Cl. .................................. 502/107; 502/120; 502/132; 502/133; 502/118; 526/119
[58] Field of Search ............... 252/429 B, 429 C, 428, 252/430

[56] References Cited

U.S. PATENT DOCUMENTS

| | | | |
|---|---|---|---|
| 3,591,656 | 7/1971 | Kroll | 252/429 C X |
| 4,148,754 | 4/1979 | Strobel et al. | 252/429 C |
| 4,263,171 | 4/1981 | Shida et al. | 252/429 C |
| 4,333,851 | 6/1982 | Speakman et al. | 252/429 B |

FOREIGN PATENT DOCUMENTS 1489410  10/1977  United Kingdom .

*Primary Examiner*—Patrick Garvin
*Attorney, Agent, or Firm*—Patricia J. Hogan

[57] ABSTRACT

Vanadium compound/organometallic compound/inorganic oxide catalyst compositions useful for the polymerization of ethylene to polymers having an intermediate molecular weight distribution that can be predictably controlled by the use of a "tunable" variable are obtained by using, as the vanadium component, a mixture of about 10–90 mol percent of $VOCl_3$ and, correspondingly, about 90–10 mol percent of $VCl_4$. The molecular weight distributions of polymers formed in the presence of the catalyst compositions are narrowed as the proportionation of $VCl_4$ in the vanadium component is increased.

17 Claims, No Drawings

CATALYST COMPOSITION

BACKGROUND OF THE INVENTION

1. Field of the Invention

This invention relates to the polymerization of olefins and more particularly relates to catalyst compositions useful for polymerizing one or more monomers comprising ethylene to polymers having an intermediate molecular weight distribution and a good balance of physical properties.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists in sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegeler catalysis in which the need for further research has been found to exist has been in the field of preparing ethylene polymers having an intermediate molecular weight distribution and a good balance of physical properties. Such polymers have particular application in the production of sheets and certain articles that are formed by blow molding, e.g., containers for milk, and—like other polymers intended for commercial use—are desirably prepared by a process which is as economical as possible as well as being capable of producing a polymer having the desired properties.

There are, of course, known processes for preparing resins having an intermediate molecular weight distribution by polymerizing ethylene with the aid of Ziegler catalysts. However, the known processes typically suffer one or more of the disadvantages of lack of economy, inability to produce polymers having a suitable balance of properties, and/or unreliability in producing such polymers—particularly in commercial-scale operations. The processes described in Monsanto's British Pat. No. 1,489,410 are among such processes. Actually, from the teachings of the patent and what can be learned from repeating its examples, it is apparent that Monsanto's processes were designed for the preparation of blow-molding resins having broader molecular weight distributions than are desired for many blow-molding resins. However, with the use of technology not taught by Monsanto, the processes can sometimes be manipulated to produce resins having intermediate molecular weight distributions as well, and they appear to be better than many known processes for preparing blow-molding ethylene polymers in some respects, e.g., in their use of supported Ziegler catalysts having a vanadium component and in their ability to produce polymers having desirable properties in laboratory-scale operations. It has been found, however, that they are unreliable in producing polymers having intermediate molecular weight distributions.

Attempts to make Monsanto's processes more reliable in producing polymers having suitable and predictable intermediate molecular weight distributions have heretofore been unsuccessful. Polymers having a variety of molecular weight distributions ranging from broad to narrow have been produced by modifying Monsanto's teachings in various ways, but a "tunable" variable, i.e., a component that can be varied in a substantially linear way so as to permit the production of polymers having a predictable variety of intermediate molecular weight distributions has not previously been discovered.

What is still needed is a catalyst which (a) is suitable for use in a gas-phase polymerization process, (b) has sufficient activity to be economically attractive, and (c) contains a tunable variable that permits the production of ethylene polymers having predictable intermediate molecular weight distributions and a good balance of physical properties.

SUMMARY OF THE INVENTION

An object of the invention is to provide novel catalyst compositions useful for the polymerization of olefins.

Another object is to provide such catalyst compositions which are useful in an economical gas-phase process for polymerizing one or more monomers comprising ethylene and which have a tunable variable permitting the production of polymers having a good balance of physical properties and predictable intermediate molecular weight distributions.

Still another object is to provide processes for preparing such catalyst compositions.

A further object is to provide olefin polymerization processes utilizing the novel catalyst compositions.

These and other objects are attained by:

(A) preparing a catalyst composition by:

(1) drying an inorganic oxide having surface hydroxyl groups to form a support that is substantially free of adsorbed water, (2) reacting the surface hydroxyl groups of the support with at least about 0.5 mol, per mol of surface hydroxyl groups, of at least one organometallic compound which corresponds to the formula $R_xMR'_yR''_z$ wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x, and (3) reacting the thus-treated support with at least about 0.001 molar proportion, per mol of organometallic compound, of a vanadium component consisting essentially of a mixture of about 10–90 mol percent of VOCl$_3$ and, correspondingly, about 90–10 mol percent of VCl$_4$ and (B) when desired, polymerizing a monomer charge comprising ethylene in contact with the catalyst composition thus prepared.

DETAILED DESCRIPTION

The inorganic oxide used in preparing a catalyst composition of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia, and mixtures thereof, i.e., physical mixtures, such as mixtures of silica and alumina particles, etc., and/or chemical mixtures, such as magnesium silicate, aluminum silicate, etc. The surface hydroxyl groups may be at the outer surfaces of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula R$_x$MR'$_y$R''$_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x. Thus, M may be, e.g., aluminum, gallium, indium, or thallium; R may be, e.g., methyl, ethyl, propyl, isopropyl, n-butyl, isobutyl, n-pentyl, isopentyl, t-pentyl, hexyl, 2-methylpenyl, heptyl, octyl, 2-ethylhexyl, nonyl, decyl, dodecyl, etc.; R', when present, may be H, Cl, an alkyl group, such as one of those exemplified above for R, which is the same as or different from R, or an alkoxy group, such as the alkoxy groups corresponding to the aforementioned alkyl groups; and R'', when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isopropenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness.

The amount of organometallic compound employed is at least about 0.5 mol per mol of surface hydroxyl groups on the inorganic oxide. There is no maximum to the amount of organometallic compound that may be employed, since (1) any amount in excess of the amount capable of reacting with the surface hydroxyl groups can be removed from the catalyst compositions in any instance wherein the presence of unreacted organometallic compound might have a deterimental effect on a polymerization process in which one of the catalyst compositions is to be used and (2) it is sometimes desirable to use excess organometallic compound in order to ensure complete reaction of the surface hydroxyl groups therewith. In general, the amount of organometallic compound reacted with the inorganic oxide varies with the molecular weight distribution desired for polymers to be prepared in the presence of the catalyst compositions—smaller amounts of organometallic compound being utilized when broader molecular weight distributions are desired, and larger amounts, i.e., at least one mol per mol of surface hydroxyl groups, being employed when narrower molecular weight distributions are desired.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide the desired molar ratio of organometallic compound to available hydroxyl groups.

As mentioned above, the vanadium component of the catalyst compositions of the invention consists essentially of a mixture of about 10–90 mol percent of $VOCl_3$ and, correspondingly, about 90–10 mol percent of $VCl_4$. It is this component that is the tunable variable of the catalyst compositions, and it is tuned to permit the formation of polymers having the desired intermediate molecular weight distributions by varying the proportions of its constituents—the largest permissable proportion of $VOCl_3$ being employed when the broadest intermediate molecular weight distributions are desired, and this proportion being gradually decreased to effect a gradual narrowing of polymer molecular weight distributions. The most preferable proportionation of the vanadium component constituents varies, of course, with the particular polymer molecular weight distribution desired. However, the vanadium components containing at least about 40 mol percent of $VCl_4$ are of particular interest in their ability to be used to prepare polymers having intermediate molecular weight distributions that have previously been the most difficult to obtain.

The amount of vanadium component employed in the practice of the invention may be varied considerably but is generally such as to provide at least about 0.001 molar proportion of vanadium component per mol of organometallic compound. When the catalyst composition is to be prepared by the preferred process described below, wherein no washing step is utilized during or after preparation of the compositions, the amount of vanadium component employed should not be substantially in excess of the amount capable of reacting with the treated support, i.e., about one molar proportion of vanadium compound per mol of organometallic compound. Use of a greater amount would serve no practical purpose and could be disadvantageous in that the excess vanadium component could lead to fouling of the polymerization reactor. However, a larger amount of vanadium component may be employed when fouling of the reactor is not expected to be a problem and/or excess vanadium component will be removed from the catalyst composition before the composition is used. In the practice of the invention, the amount of vanadium component employed is generally not in excess of about 3 molar proportions per mol of organometallic compound; and excellent results are obtained by the use of about 0.03 to 0.2 molar proportion of vanadium compound per mol of organometallic compound, i.e., about 5 to 30 mols of organometallic compound per molar proportion of vanadium component.

As indicated above, the catalyst compositions of the invention are prepared by drying the inorganic oxide, reacting the dried inorganic oxide with the organometallic compound, and reacting the thus-treated support with the vanadium component. The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100°–1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°–600° C. The time required for drying of the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$–$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding the desired amount, usually a substantially stoichiometric amount, of the organometallic compound in neat or solution form, and (4) maintaining the organometallic compound in intimate contact with the inorganic oxide, e.g., by agitating the slurry, for a time sufficient to ensure substantially complete reaction with as many of the available hydroxyl groups as can be reacted with the amount of organometallic compound employed, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium component in neat or solution form to the slurry of treated support and maintaining it in intimate contact with the treated support for a time sufficient to provide for substantially complete reaction, usually at least about 5 minutes and preferably about 10–60 minutes, although, actually, the reaction is virtually instantaneous. When the amount of vanadium component employed exceeds the amount capable of reacting with the treated support, its constituents must be premixed prior to being added to the treated support in order for the objects of the invention to be attained; but the order of addition of the constituents is immaterial when an excess of vanadium component is not employed. When the amount of vanadium component used in the practice of the invention does not exceed the amount capable of reacting with the treated support, these objects are attained whether its constituents are premixed or sequentially added to the treated support in either order.

When reaction of the vanadium component with the treated support has been accomplished, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the vanadium component has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried in a liquid medium prior to the addition of the other components, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalysts, e.g., by the use of an inert gas atmosphere, such as nitrogen.

Use of the catalyst compositions of the invention does not require any modifications of known techniques for the polymerization of ethylene, with or without comonomers. Thus, the polymerization may be conducted by a solution, slurry, or gas-phase technique, generally at a temperature in the range of about 0°–120° C. or even higher, and under atmospheric, subatmospheric, or superatmospheric pressure conditions; and conventional polymerization adjuvants, such as hydrogen, haloalkanes, etc., and conventional catalyst concentrations, e.g., about 0.01–5% by weight of monomer, may be employed if desired. However, it is generally preferred to use the catalyst compositions at a concentration such as to provide about 0.000001–0.005%, most preferably about 0.00001–0.0003%, by weight of vanadium, based on the weight of monomer(s), in the polymerization of ethylene, alone or with up to about 50%, based on the weight of total monomer, of one or more higher alpha-olefins, in a gas-phase polymerization process utilizing superatmospheric pressure, temperatures in the range of about 65°–115° C., and hydrogen and haloalkane adjuvants.

Comonomers, when employed, are generally alpha-olefins containing 3–12 carbon atoms, e.g., propylene, butene-1, pentene-1, 4-methylpentene-1, hexene-1, heptene-1, octene-1, nonene-1, decene-1, dodecene-1, etc., and mixtures thereof.

The invention is particularly advantageous in that it provides catalyst compositions which (1) have the active ingredients chemically-attached to an inorganic oxide support, (2) have a tunable variable that makes them capable of producing ethylene polymers having predictable intermediate molecular weight distributions and a good balance of physical properties by an economical gas-phase process that gives a high yield of polymer and (3) can also be used to prepare such polymers by slurry or solution processes. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by (1) measuring the apparent viscosities of the polymers at 30 $sec^{-1}$ and 300 $sec.^{-1}$, respectively, at 200° C. in an Instron capillary rheometer and (2) normalizing them to $V_{30}=5$ by the equation:

$$NVR = antilog\ (0.14699 + 0.7897\ \log V_{30} - \log V_{300})$$

where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR—a measure of the molecular weight distribution of a polymer, with the lower values indicating the narrower molecular weight distributions—is constant for any given catalyst over an $MI_2$ range of about 1–30, and only slight deviations occur outside of that range.

In the examples, the following procedures are used to prepare the catalyst compositions and polymers.

PREPARATION OF CATALYSTS

In the preparation of each of the catalysts, dry Davison 952 silica gel (a commercial inorganic oxide having a surface area of about 250–350 square meters per gram, a pore volume of about 1.5–1.7 cc per gram, and an average particle size of about 65–75 microns) by heating it under dry, deoxygenated nitrogen for about 16 hours at a temperature of about 225°–275° C. to provide an activated oxide containing about 1.4 mmols of available hydroxyl groups per gram. Cool the activated oxide to ambient temperature under a purified nitrogen blanket, suspend it in commercial hexane, add neat trialkylaluminum, and stir the resultant slurry for about 30 minutes. Then add a vanadium component in neat or solution form, stir the resultant slurry for an additional 30 minutes, allow the hexane and catalyst layers to separate, decant the clear hexane layer, and remove the remaining hexane under a nitrogen purge to produce a powdered catalyst. The particular ingredients used to prepare the catalysts and the amounts of trialkylaluminum and vanadium compounds added per gram of inorganic oxide are shown in the examples and/or tables.

SLURRY POLYMERIZATION

Charge 1.5 liters of dry hexane to a suitable autoclave under a dry, deoxygenated nitrogen atmosphere, add 1.1 cc of a 30% solution of triethylaluminum in heptane as an activator-scavenger, stir, and add a slurry of 0.1–0.4 gram of catalyst powder in, respectively, 1–4 ml of commercial hexane. Raise the temperature of the reactor to 85°–90° C., pressurize the reactor with enough hydrogen to achieve the production of a polymer having the desired melt index, add about 40–100 cc of liquid butene-1 as a comonomer, raise the reactor pressure to about 2.1 MPa with ethylene, and hold the pressure at that level throughout the polymerization by adding ethylene as needed. Immediately after pressurizing the reactor with monomer, add 5 cc of a 0.25% solution of chloroform in hexane as a promoter; and, at 15-minute intervals thereafter, add supplemental 5 cc aliquots of the promoter solution. After 30–60 minutes, stop the polymerization by venting the autoclave, opening the reactor, filtering the polymer from the liquid medium, and drying the polymer.

GAS-PHASE POLYMERIZATION

Charge the catalyst powder to a vertical cylindrical reactor adapted to contain a fluidized bed of catalyst and product particles and to permit the separation and return of entrained particles in unreacted gas by the use of a disengaging zone of larger diameter at the top of the bed.

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and supplemental activator during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare three catalyst compositions by the catalyst preparation procedure described above. Then use each of the catalyst compositions to prepare an ethylene/butene-1 copolymer by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| Run # | Catalyst Composition | Yield | MI$_2$ | NVR |
|---|---|---|---|---|
| A | VOCl$_3$/Al(C$_2$H$_5$)$_3$/SiO$_2$<br>0.1 mM 0.8 mM 1 g | 200 g | 0.32 | 2.74 |
| B | VCl$_4$/Al(C$_2$H$_5$)$_3$/SiO$_2$<br>0.05 mM 0.8 mM 1 g | 1192 g | 1.1 | 2.24 |
| 1 | VCl$_4$ + VOCl$_3$/Al(C$_2$H$_5$)$_3$/SiO$_2$<br>0.05 mM 0.05 mM 0.8 mM 1 g | 175 g | 0.36 | 2.45 |

EXAMPLE II

Repeat Example I except for reacting the surface hydroxyl groups of the silica gel with a substantially stoichiometric amount of triethylaluminum in the preparation of each of the catalyst compositions in order to produce higher yields of polymers having narrower molecular weight distributions. The amounts of ingredients employed in the preparation of the catalyst compositions, and the yields, melt indices, and NVR values of the polymers are shown in Table II.

TABLE II

| Run # | Catalyst Composition | Yield | MI$_2$ | NVR |
|---|---|---|---|---|
| C | VOCl$_3$/Al(C$_2$H$_5$)$_3$/SiO$_2$<br>0.1 mM 1.4 mM 1 g | 600 g | 0.62 | 2.57 |
| D | VCl$_4$/Al(C$_2$H$_5$)$_3$/SiO$_2$<br>0.05 mM 1.4 mM 1 g | 1716 g | 1.24 | 2.18 |
| 2 | VCl$_4$ + VOCl$_3$/Al(C$_2$H$_5$)$_3$/SiO$_2$<br>0.05 mM 0.05 mM 1.4 mM 1 g | 362 g | 27.4 | 2.39 |

EXAMPLE III

Prepare eight ethylene/butene-1 copolymers by the slurry polymerization procedure described above using, as the catalyst compositions, VCl$_4$+VOCl$_3$/Al(C$_2$H$_5$)$_3$/SiO$_2$ compositions which—like the catalyst composition of Example II, Run #2—are prepared by reacting the surface hydroxyl groups of the silica gel with a substantially stoichiometric amount of triethylaluminum but which are produced by the use of the proportionations of VCl$_4$ and VOCl$_3$ shown in Table III.

TABLE III

| Run # | Mol % VCl$_4$ | Mol % VOCl$_3$ |
|---|---|---|
| 3 | 10 | 90 |
| 4 | 20 | 80 |
| 5 | 30 | 70 |
| 6 | 40 | 60 |
| 7 | 60 | 40 |
| 8 | 70 | 30 |
| 9 | 80 | 20 |
| 10 | 90 | 10 |

The polymers prepared in Runs 3–6 have NVR values between those shown in Table II for Runs C and #2, while those prepared in Runs 7–10 have NVR values between those shown for Runs #2 and D—the NVR values decreasing substantially linearly as the proportion of VOCl$_3$ in the vanadium component is decreased.

The preceding examples show that the use of a mixture of VCl$_4$ and VOCl$_3$ as the vanadium component of the catalyst composition provides a tunable variable that permits the production, by slurry polymerization, of ethylene/butene-1 copolymers having predictable intermediate molecular weight distributions. The following examples demonstrate the effectiveness of VCl$_4$/VOCl$_3$ mixtures as a tunable variable of catalyst compositions in gas-phase polymerization processes, in copolymerizations of ethylene with other alpha-olefins, and in the homopolymerization of ethylene.

EXAMPLE IV

Repeat Examples II and III except for using each of the catalyst compositions to prepare an ethylene/butene-1 copolymer by the gas-phase polymerization procedure described above. Similar results are observed, the molecular weight distributions of the polymers being gradually narrowed as the proportion of VCl$_4$ in the vanadium component is gradually increased.

EXAMPLE V

Repeat Example IV except for employing propylene as the comonomer instead of butene-1. Similar results in controlling molecular weight distributions by varying the proportions of $VCl_4$ and $VOCl_3$ are observed.

EXAMPLE VI

Repeat Example IV except for employing no comonomer in the gas-phase polymerization processes. Similar results in controlling molecular weight distributions by varying the proportions of $VCl_4$ and $VOCl_3$ are observed.

Similar results in controlling the molecular weight distributions of ethylene polymers are obtained when the examples are repeated except that the catalyst components, component proportions, comonomers, comonomer proportions, and/or polymerization conditions specified in the examples are replaced with catalyst components, component proportions, comonomers, comonomer proportions, and/or polymerization conditions taught to be their equivalents in the specification.

I claim:

1. A catalyst composition consisting essentially of the product obtained by:
   (1) drying an inorganic oxide having surface hydroxyl groups to form a support that is substantially free of adsorbed water,
   (2) reacting the surface hydroxyl groups of the support with at least about 0.5 mol, per mol of surface hydroxyl groups, of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x, and
   (3) reacting the thus-treated support with at least about 0.001 molar proportion, per mol of organometallic compound, of a vanadium component consisting essentially of a mixture of about 10–90 mol percent of $VOCl_3$ and, correspondingly, about 90–10 mol percent of $VCl_4$.

2. The composition of claim 1 wherein the support is an inorganic oxide selected from the group consisting of silica, alumina, magnesia, and mixtures thereof.

3. The composition of claim 2 wherein the inorganic oxide is silica.

4. The composition of claim 1 wherein the organometallic compound is a compound corresponding to the formula $RAlR'R''$, wherein at least one of the R, R', and R'' substituents is an alkyl group containing 1 to 12 carbon atoms and the remaining substituents are independently selected from the group consisting of hydrogen and alkyl and alkoxy groups containing 1 to 12 carbon atoms.

5. The composition of claim 4 wherein the organometallic compound is a trialkylaluminum.

6. The composition of claim 5 wherein the trialkylaluminum is triethylaluminum.

7. The composition of claim 1 wherein the vanadium component contains at least about 40 mol percent of $VCl_4$.

8. The composition of claim 1 wherein the amounts of materials employed in its preparation are such as to provide, as starting materials, about 5 to 30 mols of organometallic compound per mol of vanadium compound.

9. The composition of claim 1 wherein the organometallic compound is employed in an amount such as to provide at least about one mol of organometallic compound per mol of surface hydroxyl groups.

10. The composition of claim 9 wherein the amount of organometallic compound reacted with the surface hydroxyl groups of the support is the substantially stoichiometric amount.

11. A process for preparing the catalyst composition of claim 1 which consists essentially of (1) drying the inorganic oxide to remove substantially all adsorbed water, (2) slurrying the dried inorganic oxide in an inert liquid hydrocarbon, (3) adding at least a substantially stoichiometric amount of the organometallic compound to react it with the surface hydroxyl groups of the inorganic oxide, (4) adding the vanadium component to react it with the treated inorganic oxide, and (5) drying the composition thus formed.

12. The process of claim 11 wherein the inorganic oxide is dried at about 100° to 1000° C. until substantially all adsorbed water is removed and is then cooled to ambient temperature before being slurried.

13. The process of claim 12 wherein the inorganic oxide is silica and the drying temperature is about 200° to 600° C.

14. The process of claim 12 wherein the inorganic oxide is magnesia and the drying temperature is about 200° to 600° C.

15. The process of claim 12 wherein the inorganic oxide is alumina and the drying temperature is about 200° to 600° C.

16. The process of claim 11 wherein the organometallic and vanadium compounds are added to the reaction mixture in neat form.

17. The process of claim 11 wherein at least one of the organometallic and vanadium compounds is added to the reaction mixture in the form of an inert liquid hydrocarbon solution.

* * * * *